(12) United States Patent
Lo et al.

(10) Patent No.: US 10,327,293 B2
(45) Date of Patent: Jun. 18, 2019

(54) DISPLAY DEVICE AND METHOD FOR CONTROLLING THE SAME

(71) Applicant: AU Optronics Corporation, Hsin-Chu (TW)

(72) Inventors: Kuo-Lung Lo, Hsin-Chu (TW); Chin-Yuan Ho, Hsin-Chu (TW); Chen-Chi Lin, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/117,654

(22) Filed: Aug. 30, 2018

(65) Prior Publication Data
US 2019/0110344 A1    Apr. 11, 2019

(30) Foreign Application Priority Data
Oct. 5, 2017 (TW) .............................. 106134421 A

(51) Int. Cl.
G09G 3/3233 (2016.01)
H05B 33/08 (2006.01)
H05B 37/02 (2006.01)

(52) U.S. Cl.
CPC ..... *H05B 33/0821* (2013.01); *H05B 33/0854* (2013.01); *H05B 37/0218* (2013.01)

(58) Field of Classification Search
CPC .... H05B 33/02; H05B 33/08; H05B 33/0803; H05B 33/0806; H05B 33/0821; H05B 33/0854; H05B 37/02; H05B 37/0209; H05B 37/0218; G09G 3/20; G09G 3/22; G09G 3/30; G09G 3/32; G09G 3/3208;
(Continued)

(56) References Cited

U.S. PATENT DOCUMENTS 8,410,680 B2 * 4/2013 Medendorp, Jr. .... C09K 11/586
313/501
8,686,458 B2 * 4/2014 Krames ................... H01L 33/32
257/98
(Continued)

FOREIGN PATENT DOCUMENTS

CN        106299326 A       12/2016
CN        107359178 A       11/2017
(Continued)

OTHER PUBLICATIONS

Office Action issued by the Taiwan Intellectual Property Office dated Dec. 6, 2017 for Application No. 106134421.

*Primary Examiner* — Jason Crawford
(74) *Attorney, Agent, or Firm* — Tim Tingkang Xia, Esq.; Locke Lord LLP

(57) ABSTRACT

A display device includes a substrate, a first light emitting element, and a second light emitting element. The substrate includes at least one pixel area. The first light emitting element and the second emitting element are disposed in the pixel area. The first light emitting element emits light of a first color and has a first luminous efficiency-injection current density function. The second light emitting element emits light of a second color and has a second luminous efficiency-injection current density function, intersected with the first luminous efficiency-injection current density function to define a critical transform current density. The light of the first color and the light of the second color have a same color system.

19 Claims, 11 Drawing Sheets

(58) Field of Classification Search
CPC .. G09G 3/3225; G09G 3/3233; G09G 3/3241; G09G 3/3283; G09G 2300/02; G09G 2300/04; G09G 2300/0404; G09G 2300/0408; G09G 2300/0452; G09G 2300/08; G09G 2310/0272; G09G 2310/0275
See application file for complete search history.

(56) References Cited

U.S. PATENT DOCUMENTS

| | | | |
|---|---|---|---|
| 10,056,030 B2* | 8/2018 | Wu | G09G 3/3225 |
| 2003/0090446 A1* | 5/2003 | Tagawa | G09G 3/3233 345/76 |
| 2011/0157250 A1* | 6/2011 | Hasegawa | G09G 3/3225 345/690 |
| 2011/0297975 A1 | 12/2011 | Yeh et al. | |
| 2014/0021883 A1 | 1/2014 | Katona et al. | |
| 2016/0314731 A1 | 10/2016 | Wu et al. | |

FOREIGN PATENT DOCUMENTS

| | | |
|---|---|---|
| TW | 201117171 A1 | 5/2011 |
| TW | 201545152 A | 12/2015 |

* cited by examiner

DISPLAY DEVICE AND METHOD FOR CONTROLLING THE SAME

CROSS-REFERENCE TO RELATED PATENT APPLICATION

This non-provisional application claims priority to and the benefit of, pursuant to 35 U.S.C. § 119(a), patent application Serial No. 106134421 filed in Taiwan on Oct. 5, 2017. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present disclosure relates to a display device and a method for controlling the same, and in particular, to an efficient display device and a method for controlling the same.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With increase of the amount of information processing of portable electronic devices, for example, notebook computers, tablet computers, smart watches and mobile phones, standby time may be further reduced, and battery life usually cannot satisfy the expectations of consumers. A display device is one of the components that consume the most electricity in a portable device. If power consumption of each pixel structure in the display device can be effectively reduced, the standby time of the portable device can increase, thereby solving a problem of insufficient battery life.

Thus, a need exists for a display device that saves electricity and is of high stability and good luminous efficiency and a method for controlling the same to solve the problem facing the prior art.

SUMMARY

An embodiment of the present invention discloses a display device, including a substrate, a first light emitting element, a second light emitting element, and a control circuit. The substrate includes at least one pixel area. The first light emitting element is disposed in the pixel area, emits light of a first color, and has a first luminous efficiency-injection current density function. The second light emitting element is disposed in the pixel area, emits light of a second color, and has a second luminous efficiency-injection current density function. The second luminous efficiency-injection current density function is intersected with the first luminous efficiency-injection current density function to define a critical transform current density, and the light of the first color and the light of the second color have a same color system. The control circuit is configured to optionally turn on at least one of the first light emitting element and the second light emitting element. The first light emitting element and the second light emitting element respectively have a first injection current density and a second injection current density, and the critical transform current density is between the first injection current density and the second injection current density Another embodiment of the present invention discloses a method for controlling a display device, including the following steps. First, a display device is provided. The display device includes a substrate, a first light emitting element, and a second light emitting element. The substrate includes at least one pixel area. The first light emitting element is disposed in the pixel area and configured to emit light of a first color; the second light emitting element is disposed in the pixel area and configured to emit light of a second color, where the light of the first color and the light of the second color have a same color system. A first luminous efficiency-injection current density function of the first light emitting element is intersected with a second luminous efficiency-injection current density function of the second light emitting element to define a critical transform current density. At least one of the first light emitting element and the second light emitting element is optionally turned on according to an ambient lightness or a gray level, so as to apply a first current to the first light emitting element turned on and apply a second current to the second light emitting element turned on. The first light emitting element turned on has a first injection current density and the second light emitting element turned on has a second injection current density. The first injection current density is less than the critical transform current density, and the critical transform current density is less than the second injection current density.

According to the foregoing embodiments, the present invention provides a display device, including at least two light emitting elements emitting light of colors in the same color system. The two light emitting elements respectively have luminous efficiency-injection current density functions that are intersected with each other to define a critical transform current density. The at least one of the first light emitting element and the second light emitting element is optionally turned on according to the ambient lightness or the gray level. The first light emitting element turned on is applied with the first current and has a first injection current density. The second light emitting element turned on is applied with the second current and has a second injection current density. The first injection current density is less than the critical transform current density, and the critical transform current density is less than the second injection current density.

The good luminous efficiency can be obtained when the first light emitting element and the second light emitting element respectively have the first injection current density and the second injection current density. Thus, in different ambient lightness or gray levels, a light emitting element with the good luminous efficiency is selected to be turned on and a light emitting element with the poor luminous efficiency is turned off, thereby effectively reducing power consumption of the display device and efficiently saving energy. In some embodiments of the present invention, the first light emitting element and the second light emitting element can be turned on simultaneously according to a display requirement, or when one of the first light emitting element and the second light emitting element fails, the other one that does not fail is selected to be turned on, thereby improving luminous stability of the display device.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Embodiments of the present invention provide a display device that saves electricity and that is of high stability and good luminous efficiency and a method for controlling the same, effectively reducing power consumption of a display device and increasing standby time, thereby solving a problem of insufficient battery life. To make the foregoing embodiments of the present invention, other objectives, features and advantages clearer, a plurality of display devices and manufacturing method thereof are provided below as examples of embodiments for detailed description with reference to the accompanying drawings.

It should be noted that these specified embodiments and methods are not used to limit the present invention. The present invention can still be implemented by using other features, components, methods and parameters. The examples of the embodiments are provided for illustration of technical features of the present invention and are not used to limit the claims of the present invention. Those skilled in the art can make equivalent modifications and changes, according to the description of the following specification, without departing from the spirit and scope of the present invention. In different embodiments and accompanying drawings, the same component is denoted as the same component symbol.

Figure 1A:
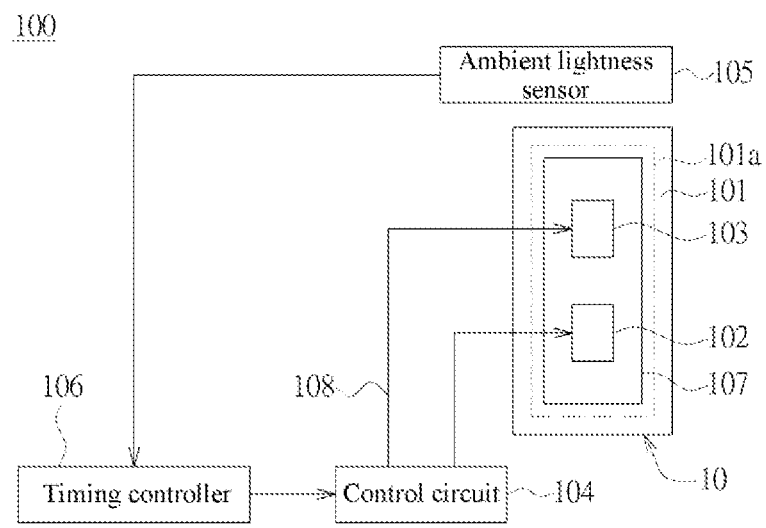
FIG. 1A is a simplified schematic diagram of a display device according an embodiment of the present invention.

FIG. 1A is a simplified schematic diagram of a display device 100 according an embodiment of the present invention. In some embodiments of the present invention, the display device 100 can be a display device built in a portable electronic device. The portable electronic device includes, for example, a notebook computer, a tablet computer, a smart watch, or a mobile phone. The display device 100 includes a substrate 101, a first light emitting element 102, a second light emitting element 103, and a control circuit 104. The substrate 101 includes at least one pixel area 101a. The first light emitting element 102 and the second light emitting element 103 are disposed in the pixel area 101a. As shown in FIG. 1A, a pixel structure 10 includes the substrate 101, the first light emitting element 102, and the second light emitting element 103. In an embodiment, the first light emitting element 102 and the second light emitting element 103 can be disposed, through a connector 107 together, in the pixel area 101a, but not limited thereto. In another embodiment, the first light emitting element 102 and the second light emitting element 103 can be disposed, through an adhesive, a conductive adhesive, a metal pad or the like, in the pixel area 101a. The first light emitting element 102 and the second light emitting element 103 emit light of colors in the same color system. In some embodiments of the present invention, a difference value of dominant wavelengths of light of colors of the first light emitting element 102 and the second light emitting element 103 is substantially less than 50 nm. In other embodiments of the present invention, a difference value of dominant wavelengths of light of colors of the first light emitting element 102 and the second light emitting element 103 is substantially less than 3 nm. The control circuit 104 is electrically connected to the first light emitting element 102 and the second light emitting element 103 by using an interconnection wire 108.

In some embodiments of the present invention, the first light emitting element 102 and the second light emitting element 103 each consist of a single micro light emitting diode (μLED) and emit, for example, blue light (B) whose wavelength range is substantially between 476 nm and 490 nm, cyan light whose wavelength range is substantially between 490 nm and 505 nm, green light (G) whose wavelength range is substantially between 505 nm and 570 nm, yellow light (Y) whose wavelength range is substantially between 570 nm and 590 nm, or red light (R) whose wavelength range is substantially between 590 nm and 750 nm.

In other embodiments of the present invention, the first light emitting element 102 and the second light emitting element 103 each consist of three micro light emitting diodes that can respectively emit red light (R), green light (G), and blue light (B), emitting white light after mixing light. In yet other embodiments of the present invention, the first light emitting element 102 and the second light emitting element 103 each consist of a single micro light emitting diode coated by different phosphor materials, where a difference value of dominant wavelengths of light of colors emitted by different phosphor materials under excitation of the two micro light emitting diodes is substantially less than 50 nm.

Figure 1B:
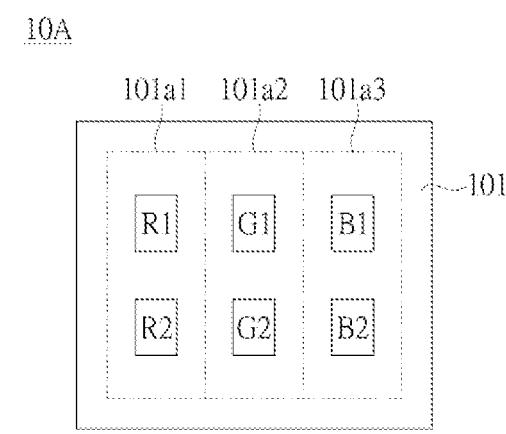
FIG. 1B is a schematic diagram of another pixel structure in the display device of FIG. 1A.

In addition, refer to FIG. 1B. FIG. 1B is a schematic diagram of another pixel structure 10A in the display device 100 of FIG. 1A. The substrate 101 includes a plurality of pixel areas 101a1, 101a2, and 101a3. The plurality of pixel areas 101a1, 101a2, and 101a3 forms a pixel array on the substrate 101. For ease of explanation, FIG. 1B shows only the pixel array including three pixel areas 101a1, 101a2, and 101a3. In this embodiment, the pixel area 101a1 includes a first light emitting element R1 of red light and a second light emitting element R2 of red light, the pixel area 101a2 includes a first light emitting element G1 of green light and a second light emitting element G2 of green light, and the pixel area 101a3 includes a first light emitting element B1 of blue light and a second light emitting element B2 of blue light. However, in the pixel structure 10A, the number of pixel areas, light of colors emitted by all the pixel areas, and an alignment method thereof are not limited thereto.

Refer to FIG. 1A. In this embodiment, the first light emitting element 102 and the second light emitting element 103 each consist of a single micro light emitting diode emitting light of the same color (for example, blue light). The first light emitting element 102 and the second light emitting element 103 have different quantum well structures. For example, a quantum well structure of the first light emitting element 102 may be of a stack (2 to 20 layers) of an indium gallium nitride layer/a gallium nitride ($In_xGa_yN$/GaN) layer of the same size; a quantum well structure of the second light emitting element 103 may be a stepped structure of an indium gallium nitride layer/a gallium nitride layer. However, the quantum well structure of the first light emitting element 102 and the second light emitting element 103 is not limited thereto. In some embodiments of the present invention, a micro light emitting diode with different luminescent characteristics may be obtained by changing permutations and combinations, components, and the thickness of a stack layer of the quantum well structure or any of the foregoing combinations.

Figure 2:
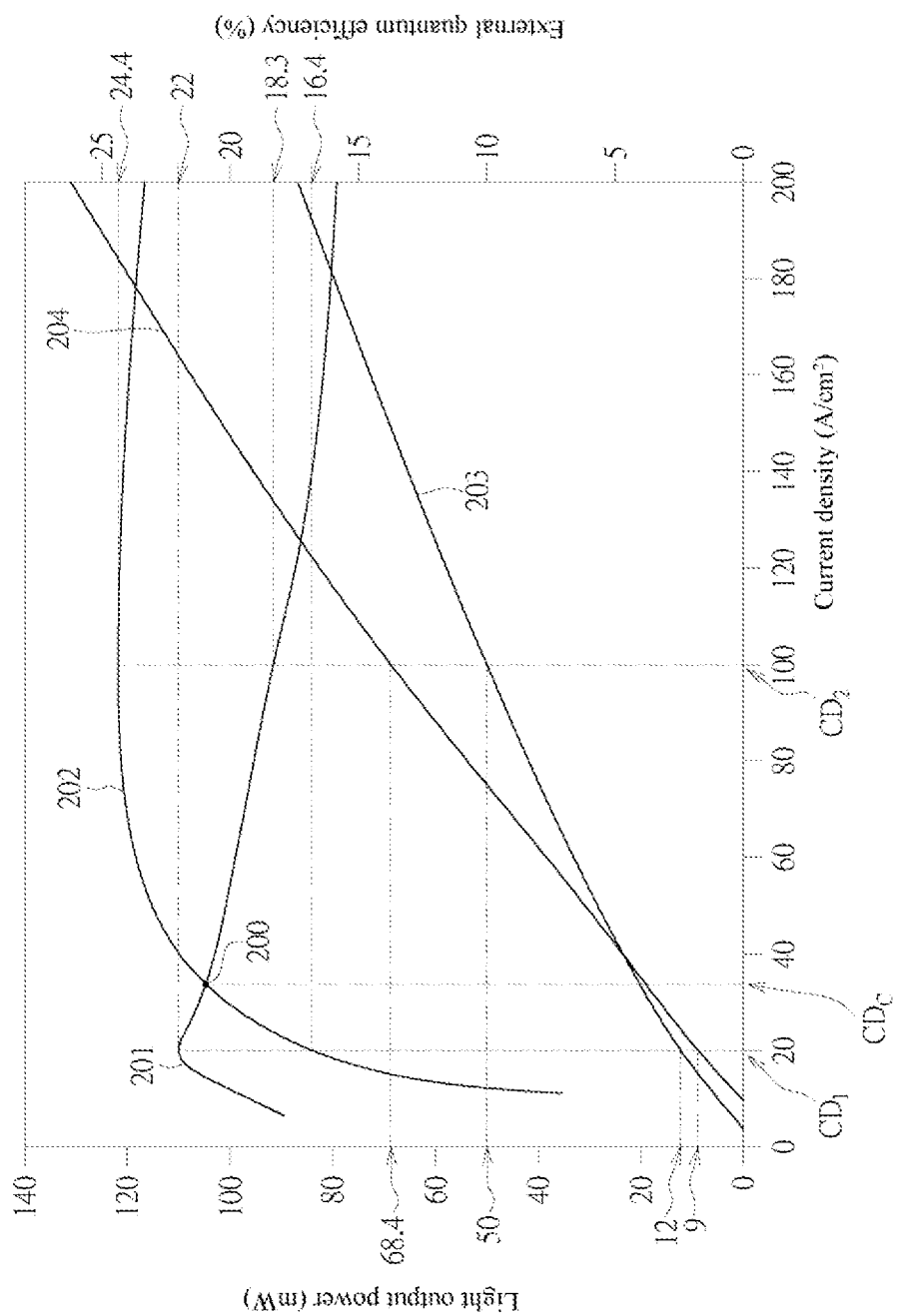
FIG. 2 is a curve chart of luminous efficiency-injection current density functions of a first light emitting element, and a second light emitting element according to an embodiment of the present invention.

The first light emitting element 102 and the second light emitting element 103 have different quantum well structures, and when injected with a current of the same density, the first light emitting element 102 and the second light emitting element 103 have different luminous efficiency. Thus, two different curves of luminous efficiency-injection current density functions can be made. Referring to FIG. 2, FIG. 2 is a curve chart of luminous efficiency-injection current density functions of the first light emitting element 102 and the second light emitting element 103 according to an embodiment of the present invention. A horizontal axis of the curve chart indicates a current density (the unit is Amps/cm² (A/cm²)); a vertical axis of the curve chart respectively indicates the external quantum efficiency (EQE) (the unit is percentage (%)) and a light output power (the unit is milliwatt (mW)). In this embodiment, the light output power is substantially equal to a product of the external quantum efficiency and a current (I) and a voltage (V) applied to a light emitting element (light output power=EQE×I×V).

A curve 201 represents a luminous efficiency-injection current density function of the first light emitting element 102 (a first luminous efficiency-injection current density function 201); a curve 202 represents a luminous efficiency-injection current density function of the second light emitting element 103 (a second luminous efficiency-injection current density function 202); a curve 203 represents a light output power-injection current density function of the first light emitting element 102; a curve 204 represents a light output power-injection current density function of the second light emitting element 103. An intersection 200 of the first luminous efficiency-injection current density function 201 and the second luminous efficiency-injection current density function 202 can be used to define a critical transform current density CDc. An injection current density $CD_1$ corresponding to a maximum light output power of the first luminous efficiency-injection current density function 201 is substantially less than the critical transform current density CDc; an injection current density $CD_2$ corresponding to a maximum light output power of the second luminous efficiency-injection current density function 202 is substantially greater than the critical transform current density CDc.

The control circuit 104 is configured to optionally turn on at least one of the first light emitting element 102 and the second light emitting element 103; that is, the control circuit 104 is configured to optionally turn on one of the first light emitting element 102 and the second light emitting element 103 or turn on both simultaneously. The first light emitting element 102 turned on has the injection current density $CD_1$, and the second light emitting element 103 turned on has the injection current density $CD_2$. In this embodiment, the control circuit 104 selects to turn on one of the first light emitting element 102 and the second light emitting element 103 or turn on both simultaneously, according to an ambient lightness detected by using an external ambient lightness sensor 105, to deal with different external ambient, thereby obtaining a best display efficiency of the display device 100.

For example, referring to FIG. 2, in this embodiment, the critical transform current density CDc of the first light emitting element 102 and the second light emitting element 103 is substantially 33 A/cm². When the first light emitting element 102 and the second light emitting element 103 are injected with a current density less than the critical transform current density CDc, for example, 20 A/cm², a light output power (as shown in the curve 203) of the first light emitting element 102 is 12 mW; a light output power (as shown in the curve 204) of the second light emitting element 103 is 9 mW; an external quantum efficiency (as shown in the curve 201) of the first light emitting element 102 is 22.0%; an external quantum efficiency (as shown in the curve 202) of the second light emitting element 103 is 16.4%. When the first light emitting element 102 and the second light emitting element 103 are injected with a current density greater than the critical transform current density CDc, for example, 100 A/cm², a light output power (as shown in the curve 203) of the first light emitting element 102 is 50 mW; a light output power (as shown in the curve 204) of the second light emitting element 103 is 68.4 mW; an external quantum efficiency (as shown in the curve 201) of the first light emitting element 102 is 18.3%; an external quantum efficiency (as shown in the curve 202) of the second light emitting element 103 is 24.4%.

Thus, when the ambient lightness detected by using the external ambient lightness sensor 105 is low and a display can obtain an display effect without an excessively high lightness, the control circuit 104 can select to turn on the first light emitting element 102 through a timing controller (Tcon) 106 and inject a small current (for example, $1.2 \times 10^{-5}$ A), thereby obtaining the good luminous efficiency by using a low light output power. When the ambient lightness detected by using the external ambient lightness sensor 105 is high and a display cannot obtain an display effect without improving a lightness, the control circuit 104 can select to turn on the second light emitting element 103 through the timing controller (Tcon) 106 and inject a relatively large current (for example, $4 \times 10^{-5}$ A), thereby obtaining a high light output power and the good luminous efficiency.

In other embodiments of the present invention, the control circuit 104 may also select to turn on the first light emitting element 102 and the second light emitting element 103 simultaneously and inject different current densities to the first light emitting element 102 and the second light emitting element 103 to provide a higher light output power while guaranteeing a good luminous efficiency according to a display requirement. A difference value of the current densities injected to the first light emitting element 102 and the second light emitting element 103 may substantially be between 10 A/cm$^2$ and 150 A/cm$^2$. In yet other embodiments of the present invention, when the control circuit 104 detects that the first light emitting element 102 or the second light emitting element 103 fails, the other one of the first light emitting element 102 and the second light emitting element 103, that does not fail, is selected to be turned on. In addition, the control circuit 104 may also detect a gray level corresponding to display data of the display device 100, and optionally turn on the first light emitting element 102, turn on the second light emitting element 103, or turn on the first light emitting element 102 and the second light emitting element 103 simultaneously, according to the gray level. In other words, the control circuit 104 turns on, according to a first grayscale value, the first light emitting element 102, and the control circuit 104 turns on, according to a second grayscale value, the second light emitting element 103.

Figure 3A:
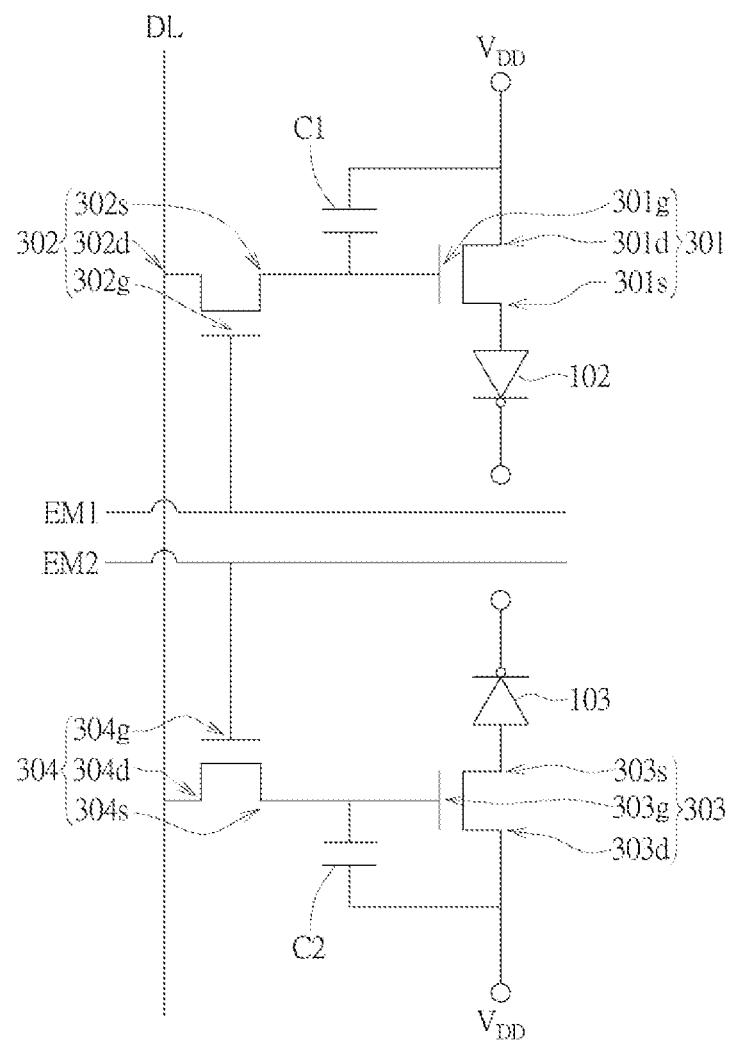
FIG. 3A is a layout diagram of a control circuit according to an embodiment of the present invention.
Figure 3B:
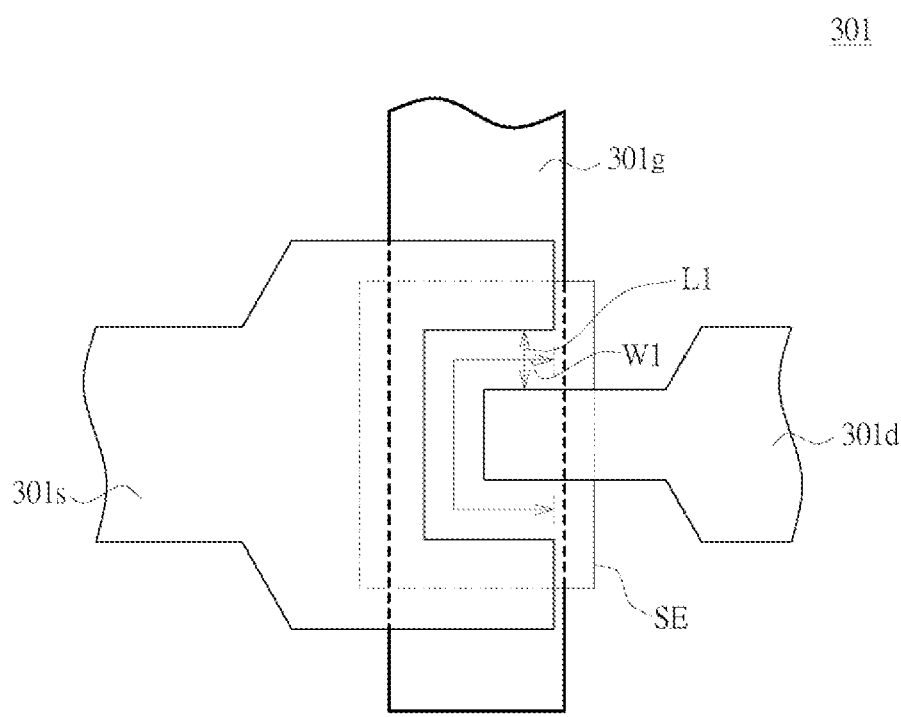
FIG. 3B is a top view of a partial structure of the control circuit according to FIG. 3A.

Referring to FIG. 3A and FIG. 3B, FIG. 3A is a layout diagram of a part of the control circuit 104 according to an embodiment of the present invention. FIG. 3B is a top view of a partial structure of the control circuit 104 according to FIG. 3A. The control circuit 104 includes a first transistor switch 301, a second transistor switch 302, a third transistor switch 303, a fourth transistor switch 304, a data line DL, a first capacitor C1, a second capacitor C2, a voltage source $V_{DD}$, a first scan line EM1, and a second scan line EM2. In this embodiment, the first transistor switch 301, the second transistor switch 302, the third transistor switch 303, and the fourth transistor switch 304 may be n-type transistors, but it is not limited thereto. In another embodiment, the first transistor switch 301, the second transistor switch 302, the third transistor switch 303, and the fourth transistor switch 304 may be p-type transistors (p-type transistor).

A drain 301d and a source 301s of the first transistor switch 301 are electrically connected to the voltage source $V_{DD}$, and the first light emitting element 102. A gate 302g of the second transistor switch 302 is electrically connected to the first scan line EM1, and a drain 302d and a source 302s of the second transistor switch 302 are respectively electrically connected to the data line DL, and a gate 301g of the first transistor switch 301. A drain 303d and a source 303s of the third transistor switch 303 are electrically connected to the voltage source $V_{DD}$ and the second light emitting element 103. A gate 304g, a drain 304d, and a source 304s of the fourth transistor switch 304 are respectively electrically connected to the second scan line EM2, the data line DL, and a gate 303g of the third transistor switch 303. One end of the first capacitor C1 is electrically connected to the voltage source $V_{DD}$ and the drain 301d of the first transistor switch 301, and the other end is electrically connected to the gate 301g of the first transistor switch 301 and the source 302s of the second transistor switch 302. One end of the second capacitor C2 is electrically connected to the voltage source $V_{DD}$ and the drain 303d of the third transistor switch 303, and the other end is electrically connected to the gate 303g of the third transistor switch 303 and the source 304s of the fourth transistor switch 304.

For ease of explanation, in this embodiment, the first transistor switch 301, the second transistor switch 302, the third transistor switch 303, and the fourth transistor switch 304 of the control circuit 104 are n-type transistors, but not limited thereto. In another embodiment, the first transistor switch 301, the second transistor switch 302, the third transistor switch 303, and the fourth transistor switch 304 of the control circuit 104 may also be p-type transistors.

When the control circuit 104 selects to turn on the first light emitting element 102, the control circuit 104 outputs a control signal through the first scan line EM1 and the second scan line EM2 to turn off the fourth transistor switch 304 and turn on the second transistor switch 302; and outputs the control signal through the data line DL and enables (enable) the first transistor switch 301 by using the second transistor switch 302, so that a current injects to the first light emitting element 102 from the voltage source $V_{DD}$ through the first transistor switch 301. When the control circuit 104 selects to turn on the second light emitting element 103, the control circuit 104 outputs the control signal through the first scan line EM1 and the second scan line EM2 to turn off the second transistor switch 302 and turn on the fourth transistor switch 304; and outputs the control signal through the data line DL and enables (enable) the third transistor switch 303 by using the fourth transistor switch 304, so that a current injects to the second light emitting element 103 from the voltage source $V_{DD}$ through the third transistor switch 303.

In some embodiments of the present invention, the first transistor switch 301 and the third transistor switch 303 may be a thin film transistor (TFT) made by the same process. Amounts of current injected to the first light emitting element 102 and the second light emitting element 103 may be controlled by adjusting a size of a channel of the first transistor switch 301 and the third transistor switch 303. A ratio of a channel width W1 to a channel length L1 of the first transistor switch 301 (W1/L1, a first channel aspect ratio) is substantially less than a ratio of a channel width W2 to a channel length L2 of the third transistor switch 303 (W2/L2, a second channel aspect ratio). In some embodiments of the present invention, a ratio (W2/L2)/(W1/L1) of the second channel aspect ratio (W2/L2) to the first channel aspect ratio (W1/L1) is substantially greater than 1.5. For ease of explanation, FIG. 3B shows only a measurement manner of the channel width W1 and the channel length L1 of the first transistor switch 301. The first transistor switch 301 includes the gate 301g, the source 301s, the drain 301d, and a semiconductor layer SE. A measurement manner of the channel width W2 and the channel length L2 of the third transistor switch 303 may be deduced by analogy.

To be more specific, in a linear operating interval, a formula of a current driving the thin film transistor (TFT) assembly is:

$$I_{DS} = C_{ox} \times \mu \times W/L \times (V_{GS} - V_{th}) \times V_{DS}, \text{ where}$$

$I_{DS}$ is a current passing through a source/a drain of a transistor, $C_{ox}$ is a unit capacitance of a transistor, μ is carrier mobility of a transistor, W/L is a channel aspect ratio, $V_{GS}$ is a voltage between a source/a gate of a transistor, $V_{th}$ is a critical voltage of a transistor, and $V_{DS}$ is a voltage between a source/a drain of a transistor. The first transistor switch 301 and the third transistor switch 303 are made by the same process. Thus, the current of the transistor $I_{DS}$, the unit capacitance $C_{ox}$, and the carrier mobility μ are the same. When the applied voltages $V_{GS}$ and $V_{DS}$ are the same, an aspect ratio of the first transistor switch 301 to the third transistor switch 303 is substantially proportional to amounts of current $I_{DS1}$ and $I_{DS2}$ injected to the first transistor switch 301 to the third transistor switch 303. A ratio (W1/L1)/(W2/L2) of the first channel aspect ratio (W1/W2) to the second channel aspect ratio (W2/L2) is substantially proportional to a ratio of an amount of an output current $I_{DS}$, namely:

$$I_{DS2}/I_{DS1}=(W2/L2)/(W1/L1).$$

If the amounts of the current of the first light emitting element 102 and the second light emitting element 103 are calculated in current densities of the first light emitting element 102 and the second light emitting element 103 in the embodiment of FIG. 2, and are substituted into the foregoing formula, the ratio (W2/L2)/(W1/L1) of the first channel aspect ratio (W1/L1) of the first transistor switch 301 to the second channel aspect ratio (W2/L2) of the third transistor switch 303 can be estimated to be substantially $I_{DS2}/I_{DS1}=4\times 10^{-5}$ A/$1.3\times 10^{-5}$ A=10/3. However, the first channel aspect ratio (W1/L1) and the second channel aspect ratio (W2/L2) are not limited thereto. Those skilled in the art can adjust and control, according to actual requirements, amounts of current $I_{DS1}$ and $I_{DS2}$ injected to the first transistor switch 301 and the third transistor switch 303 by adjusting the channel widths W1 and W2 and the channel lengths L1 and L2 of the first transistor switch 301 and the third transistor switch 303.

Figure 4A:
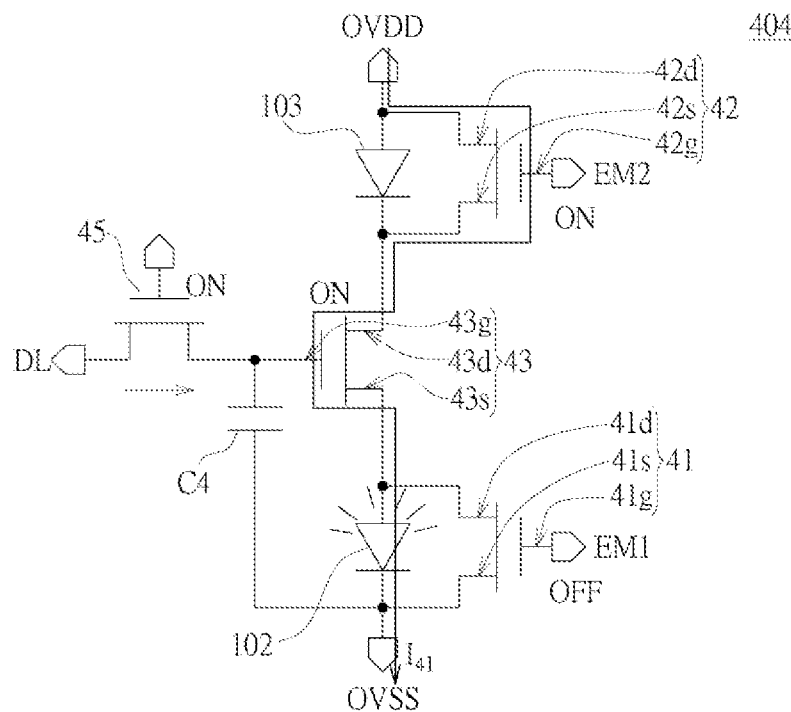
FIG. 4A and FIG. 4B are layout diagrams of a part of a control circuit of a display device according to another embodiment of the present invention and show operating status thereof.
Figure 4B:
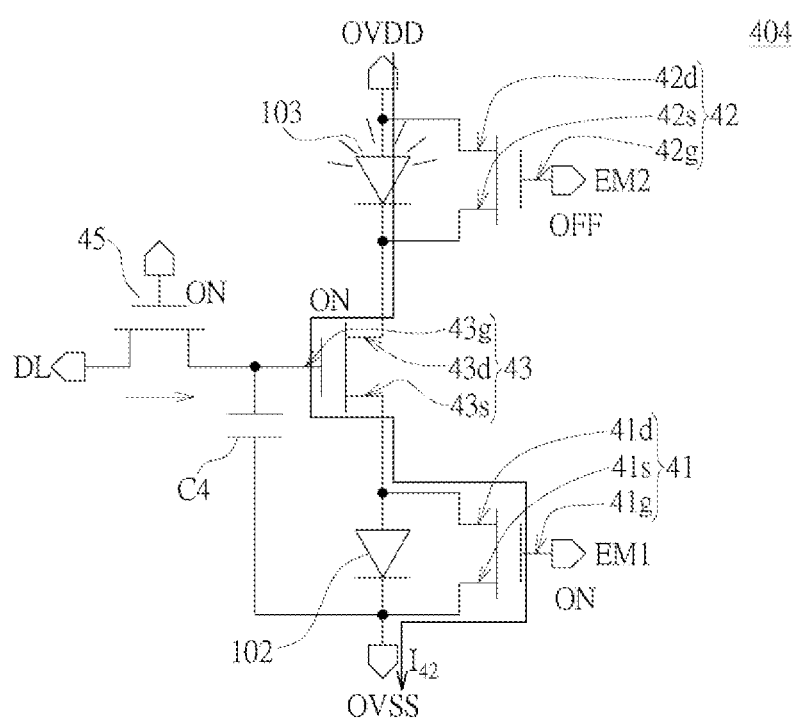

A layout manner of a control circuit of the display device 100 is not limited thereto. Referring to FIG. 4A and FIG. 4B, FIG. 4A and FIG. 4B are layout diagrams of a part of a control circuit 404 of the display device 100 according to another embodiment of the present invention and show operating status thereof. The control circuit 404 includes a first transistor switch 41, a second transistor switch 42, a third transistor switch 43, a first voltage source OVSS, a second voltage source OVDD, the first scan line EM1, the second scan line EM2, the data line DL, and a capacitor C4.

The first transistor switch 41, the second transistor switch 42, and the third transistor switch 43 may be n-type transistors, but not limited thereto. In some embodiments of the present invention, the first transistor switch 41, the second transistor switch 42, and the third transistor switch 43 may be p-type transistors.

The first light emitting element 102 is electrically connected to the first voltage source OVSS. The first transistor switch 41 is connected in parallel to the first light emitting element 102; and a gate 41g and a source 41s of the first transistor switch 41 are respectively electrically connected to the first scan line EM1 and the first voltage source OVSS; a drain 41d is electrically connected to a source 43s of the third transistor switch 43. The second light emitting element 103 is electrically connected to the second voltage source OVDD. The second transistor switch 42 is connected in parallel to the second light emitting element 103; and the gate 42g and a drain 42d of the second transistor switch 42 are respectively electrically connected to the second scan line EM2 and the second voltage source OVDD; a source 42s is electrically connected to a drain 43d of the third transistor switch 43. A gate 43g, the source 43s, and the drain 43d of the third transistor switch 43 are respectively electrically connected to the data line DL, the first light emitting element 102, and the second light emitting element 103. One end of the capacitor C4 is electrically connected to the data line DL and the gate 43g of the third transistor switch 43, and the other end is electrically connected to the first light emitting element 102, the source 41s of the first transistor switch 41, and the first voltage source OVSS. In some embodiments of the present invention, a control switch 45 is further included between the data line DL and the third transistor switch 43.

When the control circuit 404 selects to turn on the first light emitting element 102 (as shown in FIG. 4A), the control circuit 404 outputs a control signal through the first scan line EM1 and the second scan line EM2 to turn off the first transistor switch 41 and turn on the second transistor switch 42; and outputs the control signal through the data line DL and enables (enable) the third transistor switch 43 by using the control switch 45, so that a current $I_{41}$ injects to the first light emitting element 102 from the voltage second source OVDD through the second transistor switch 42 and the third transistor switch 43. When the control circuit 404 selects to turn on the second light emitting element 103 (as shown in FIG. 4B), the control circuit 404 outputs the control signal through the first scan line EM1 and the second scan line EM2 to turn off the second transistor switch 42 and turn on the first transistor switch 41; and outputs the control signal through the data line DL and enables (enable) the third transistor switch 43 by using the control switch 45, so that that current $I_{42}$ injects to the second light emitting element 103 from the voltage source OVDD.

Figure 5:
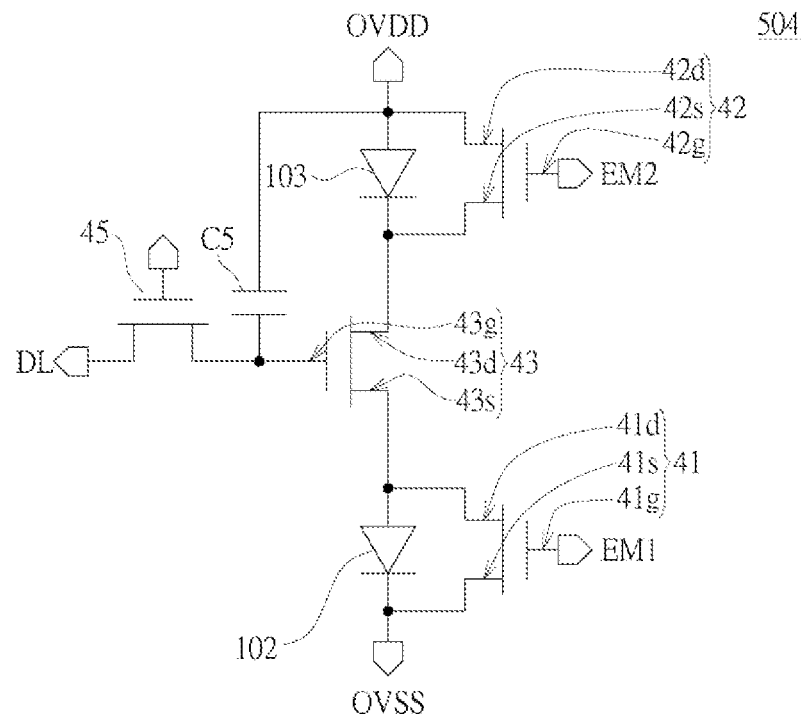
FIG. 5 is a layout diagram of a part of a control circuit of a display device according to an embodiment of the present invention.

Referring to FIG. 5, FIG. 5 is a layout diagram of a part of a control circuit 504 of the display device 100 according to an embodiment of the present invention. A layout manner of the control circuit 504 is similar to that of the control circuit 404 in FIG. 4A and FIG. 4B, and a difference lies in that a connection manner of the capacitor C4 in FIG. 4A and FIG. 4B is different from that of a capacitor C5 in FIG. 5. In this embodiment, one end of the capacitor C5 is electrically connected to the data line DL and the gate 43g of the third transistor switch 43, and the other end is electrically connected to the second light emitting element 103, the drain 42d of the second transistor switch 42, and the second voltage source OVDD. Because a controlling manner and an operating status of the control circuit 504 are the same as those in FIG. 4A and FIG. 4B, details are not described herein.

Figure 6:
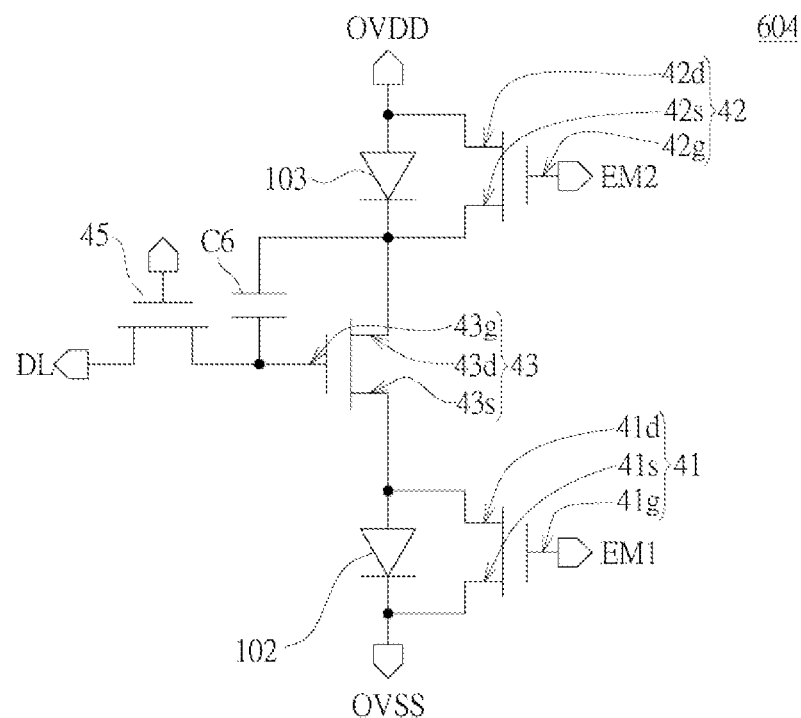
FIG. 6 is a layout diagram of a part of a control circuit of a display device according to an embodiment of the present invention.

Referring to FIG. 6, FIG. 6 is a layout diagram of a part of a control circuit 604 of the display device 100 according to an embodiment of the present invention. A layout manner of the control circuit 604 is similar to that of the control circuit 404 in FIG. 4A and FIG. 4B, and a difference lies in that a connection manner of the capacitor C4 in FIG. 4A and FIG. 4B is different from that of a capacitor C6 in FIG. 6. In this embodiment, one end of the capacitor C6 is electrically connected to the data line DL and the gate 43g of the third transistor switch 43, and the other end is electrically connected to the second light emitting element 103, the source 42s of the second transistor switch 42, and the drain 43d of the third transistor switch 43. Because a controlling manner and an operating status of the control circuit 604 are the same as those in FIG. 4A and FIG. 4B, details are not described herein.

Figure 7:
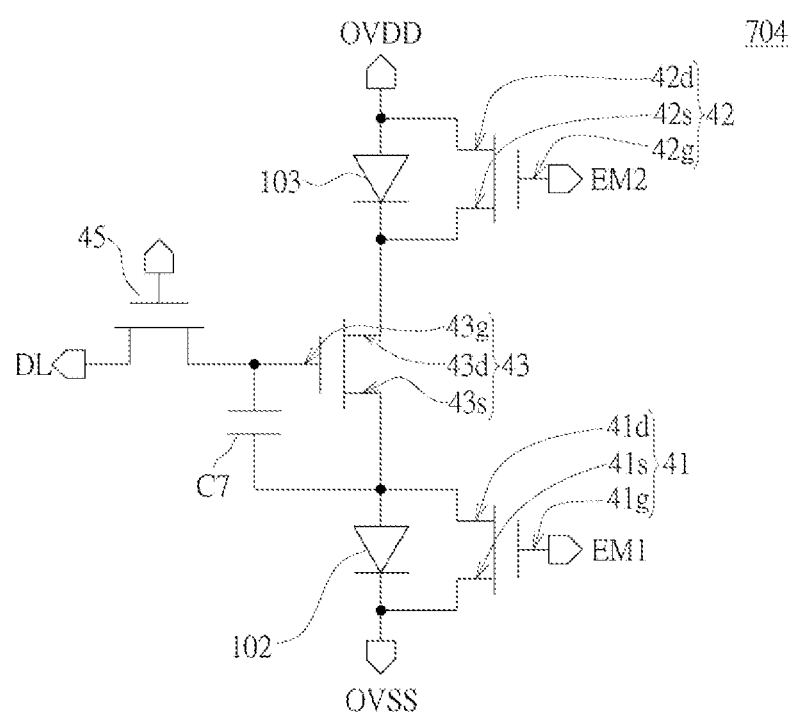
FIG. 7 is a layout diagram of a part of a control circuit of a display device according to an embodiment of the present invention.

Referring to FIG. 7, FIG. 7 is a layout diagram of a part of a control circuit 704 of the display device 100 according to an embodiment of the present invention. A layout manner of the control circuit 704 is similar to that of the control circuit 404 in FIG. 4A and FIG. 4B, and a difference lies in that a connection manner of the capacitor C4 in FIG. 4A and FIG. 4B is different from that of a capacitor C7 in FIG. 7. In this embodiment, one end of the capacitor C7 is electrically connected to the data line DL and the gate 43g of the third transistor switch 43, and the other end is electrically connected to the first light emitting element 102, the drain 42d of the first transistor switch 41, and the source 43s of the third transistor switch 43. Because a controlling manner and an operating status of the control circuit 704 are the same as those in FIG. 4A and FIG. 4B, details are not described herein.

Figure 8A:
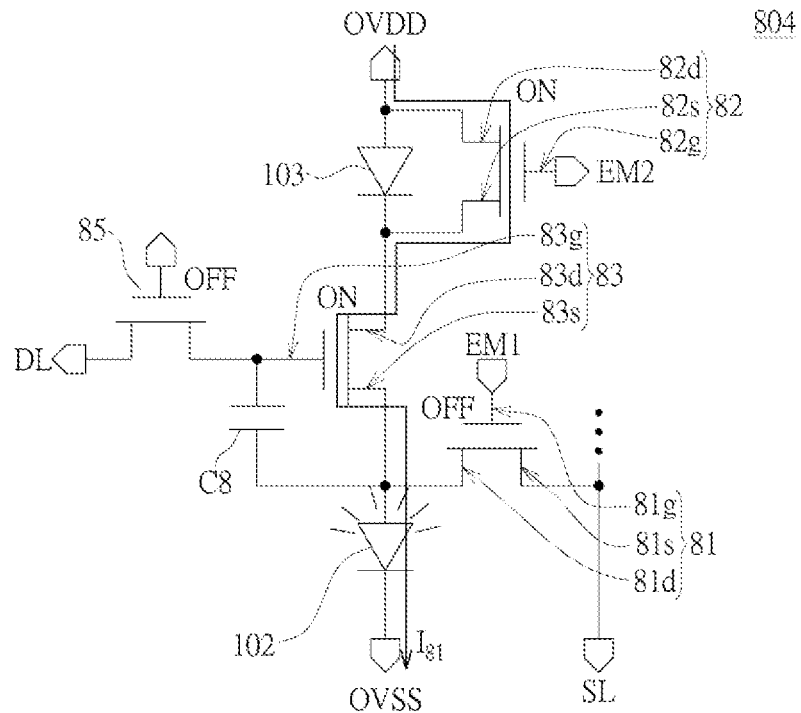
FIG. 8A and FIG. 8B are layout diagrams of a part of a control circuit of a display device according to another embodiment of the present invention and show operating status thereof.
Figure 8B:
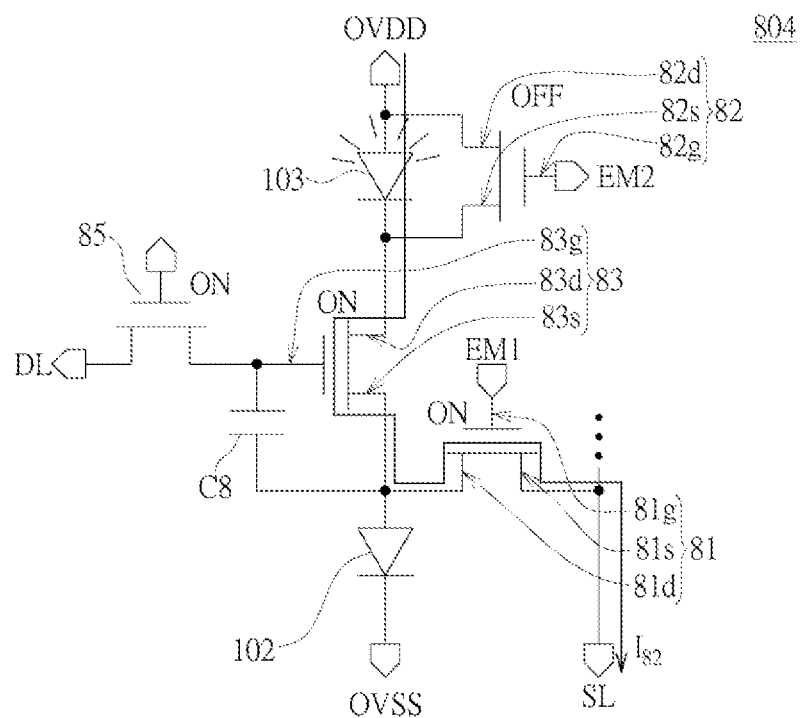

In some embodiments of the present invention, a control circuit of the display device 100 may further include a sensing circuit. For example, referring to FIG. 8A and FIG. 8B, FIG. 8A and FIG. 8B are layout diagrams of a part of a control circuit 804 of the display device 100 according to another embodiment of the present invention and show operating status thereof. The control circuit 804 includes a first transistor switch 81, a second transistor switch 82, a third transistor switch 83, a control switch 85, the first voltage source OVSS, the second voltage source OVDD, the first scan line EM1, the second scan line EM2, the data line DL, a capacitor C8, and a sensing circuit SL. The sensing circuit SL may be connected to an external reference circuit (not shown), externally compensating the current injected to the first light emitting element 102 and the second light emitting element 103.

The first transistor switch 81, the second transistor switch 82 and the third transistor switch 83, and the control switch 85 may be n-type transistors, but not limited thereto. In some embodiments of the present invention, the first transistor switch 81, the second transistor switch 82, the third transistor switch 83, and the control switch 85 may be p-type transistor.

The first light emitting element 102 is electrically connected to the first voltage source OVSS. A gate 81g of the first transistor switch 81 is electrically connected to the first scan line EM1, a source 81s is electrically connected to the sensing circuit SL, and a drain 81d is electrically connected to the first light emitting element 102 and a source 83s of the third transistor switch 83. The second light emitting element 103 is electrically connected to the second voltage source OVDD. The second transistor switch 82 is connected in parallel to the second light emitting element 103; and a gate 82g and a drain 82d of the second transistor switch 82 are respectively electrically connected to the second scan line EM2 and the second voltage source OVDD; a source 82s is electrically connected to a drain 83d of the third transistor switch 83. A gate 83g, the source 83s, and the drain 83d of the third transistor switch 83 are respectively electrically connected to the data line DL, the first light emitting element 102, and the second light emitting element 103. One end of the capacitor C8 is electrically connected to the data line DL and the gate 83g of the third transistor switch, and the other end is electrically connected to the first light emitting element 102, the source 83s of the first transistor switch, and the first transistor switch 81. The control switch 85 is electrically connected between the data line DL and the third transistor switch 83.

When the control circuit 804 selects to turn on the first light emitting element 102, the control circuit 804 outputs a control signal through the first scan line EM1 and the second scan line EM2 to turn off the first transistor switch 81 and turn on the second transistor switch 82; and enables the control switch 85, and outputs the control signal through the data line DL, and turns on the third transistor switch 83 by using the control switch 85, so that a current $I_{81}$ injects to the first light emitting element 102 from the second voltage source OVDD through the second transistor switch 82 and the third transistor switch 83 (as shown in FIG. 8A). When the control circuit 804 selects to turn on the second light emitting element 103, the control circuit 804 outputs the control signal through the first scan line EM1 and the second scan line EM2 to turn on the first transistor switch 81 and turn off the second transistor switch 82; and enables the control switch 85, and outputs the control signal through the data line DL, and turns on the third transistor switch 83 by using the control switch 85 so that a current $I_{82}$ injects to the second light emitting element 103 from the second voltage source OVDD (as shown in FIG. 8B).

Figure 9:
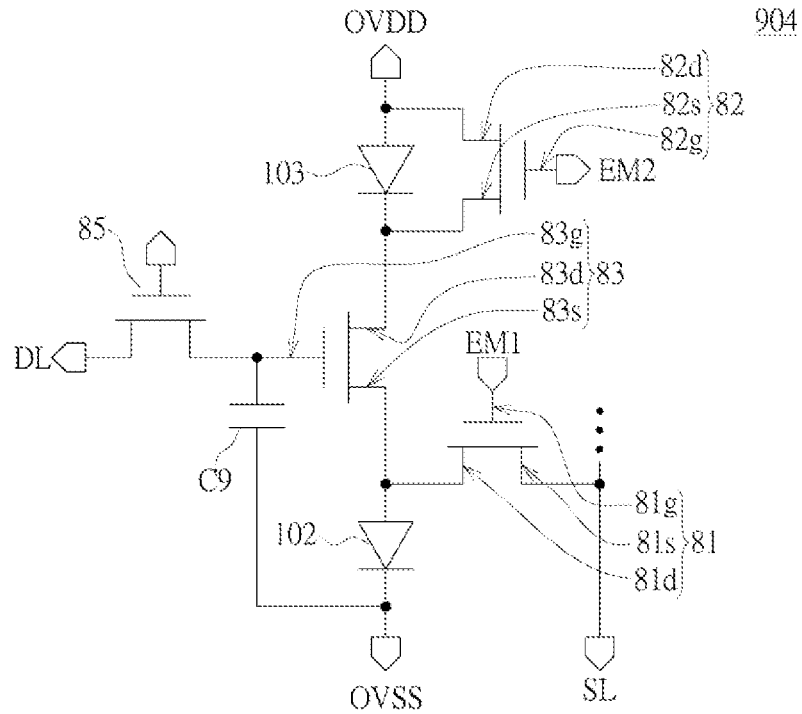
FIG. 9 is a layout diagram of a part of a control circuit of a display device according to an embodiment of the present invention.

Referring to FIG. 9, FIG. 9 is a layout diagram of a part of a control circuit 904 of the display device 100 according to an embodiment of the present invention. A layout manner of the control circuit 904 is similar to that of the control circuit 804 in FIG. 8A and FIG. 8B, and a difference lies in that a connection manner of the capacitor C8 in FIG. 8A and FIG. 8B is different from that of a capacitor C9 in FIG. 9. In this embodiment, one end of the capacitor C9 is electrically connected to the data line DL and the gate 83g of the third transistor switch 83, and the other end is electrically connected to the first light emitting element 102 and the first voltage source OVSS. Because a controlling manner and an operating status of the control circuit 904 are the same as those in FIG. 8A and FIG. 8B, details are not described herein.

Figure 10:
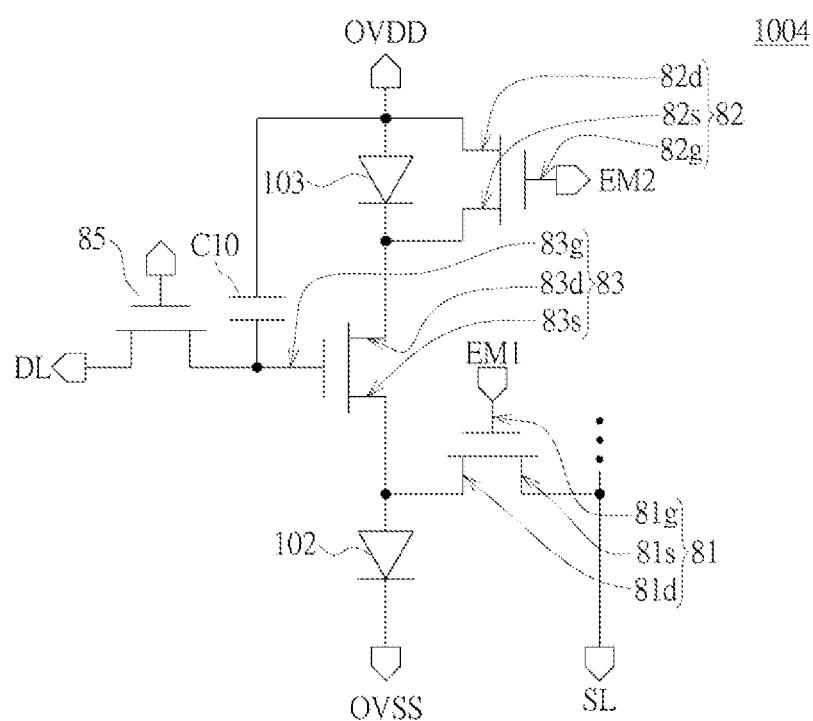
FIG. 10 is a layout diagram of a part of a control circuit of a display device according to an embodiment of the present invention.

Referring to FIG. 10, FIG. 10 is a layout diagram of a part of a control circuit 1004 of the display device 100 according to an embodiment of the present invention. A layout manner of the control circuit 1004 is similar to that of the control circuit 804 in FIG. 8A and FIG. 8B, and a difference lies in that a connection manner of the capacitor C8 in FIG. 8A and FIG. 8B is different from that of a capacitor C10 in FIG. 10. In this embodiment, one end of the capacitor C10 is electrically connected to the data line DL and the gate 83g of the third transistor switch 83, and the other end is electrically connected to the second light emitting element 103, the drain 82d of the second transistor switch 82, and the second voltage source OVDD. Because a controlling manner and an operating status of the control circuit 1004 are the same as those in FIG. 8A and FIG. 8B, details are not described herein.

Figure 11:
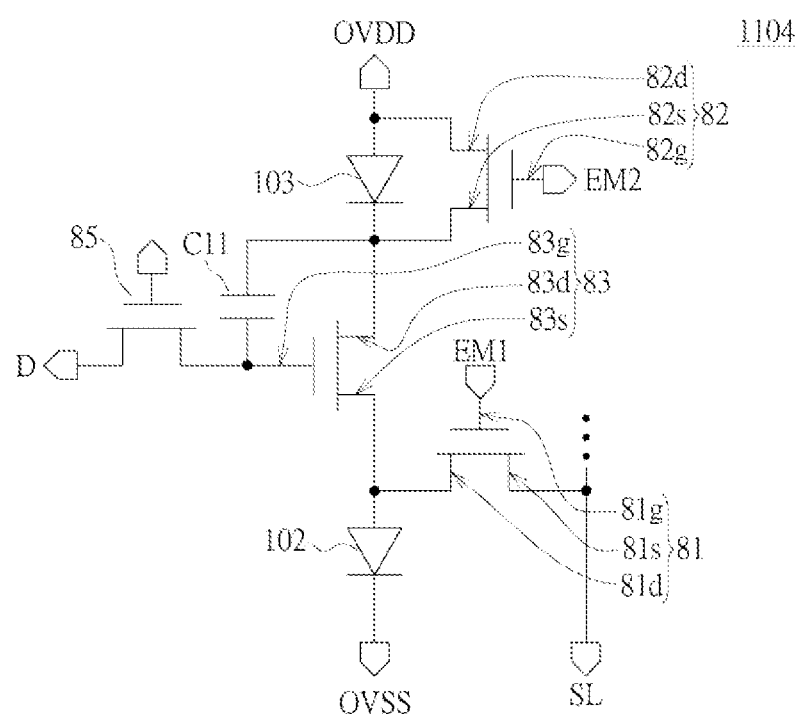
FIG. 11 is a layout diagram of a part of a control circuit of a display device according to an embodiment of the present invention.

Referring to FIG. 11, FIG. 11 is a layout diagram of a part of a control circuit 1104 of the display device 100 according to an embodiment of the present invention. A layout manner of the control circuit 1104 is similar to that of the control circuit 804 in FIG. 8A and FIG. 8B, and a difference lies in that a connection manner of the capacitor C8 in FIG. 8A and FIG. 8B is different from that of a capacitor C11 in FIG. 11. In this embodiment, one end of the capacitor C11 is electrically connected to the data line DL and the gate 83g of the third transistor switch 83, and the other end is electrically connected to the second light emitting element 103, the source 82s of the second transistor switch 82, and the drain 83d of the third transistor switch 83. Because a controlling manner and an operating status of the control circuit 1104 are the same as those in FIG. 8A and FIG. 8B, details are not described herein.

Figure 12:
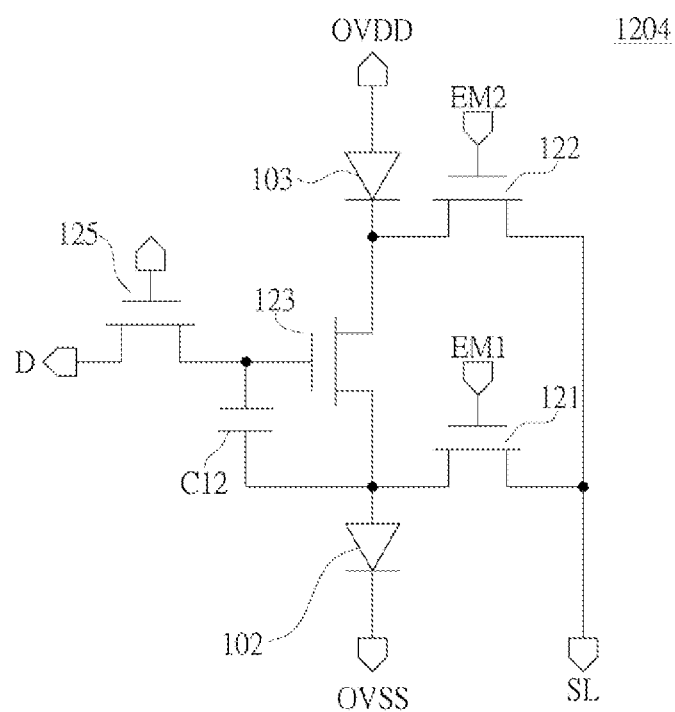
FIG. 12 is a layout diagram of a part of a control circuit of a display device according to another embodiment of the present invention.

It should be noted that a connection manner of the first transistor switch 81, the first light emitting element 102, the second transistor switch 82, the third transistor switch 83, the control switch 85, and the second light emitting element 103 in FIG. 11 is not limited thereto. The connection manner may further be adjusted according to an electrical (n-type or p-type) difference of a transistor used by the first transistor switch 81, the second transistor switch 82, the third transistor switch 83 and the control switch 85. For example, in another embodiment of the present invention, one end of the second transistor 82 may be electrically connected to the sensing circuit SL, the other end is electrically connected the second light emitting element 103, and the first transistor switch 81 is connected in parallel to the first light emitting element 102 (not shown). Referring to FIG. 12, FIG. 12 is a layout diagram of a part of a control circuit 1204 of the display device 100 according to another embodiment of the present invention. The control circuit 1204 includes a first transistor switch 121, a second transistor switch 122, a third transistor switch 123, a control switch 125, the first voltage source OVSS, the second voltage source OVDD, the first scan line EM1, the second scan line EM2, the data line DL, a capacitor C12, and the sensing circuit SL. A layout manner of the control circuit 1204 is similar to that of the control circuit 1104 in FIG. 11, and a difference lies in that the second transistor switch 122 in FIG. 12 is not connected in parallel to the second light emitting element 103; and one ends of the first transistor switch 121 and the second transistor switch 122 are electrically connected the sensing circuit SL.

It should be noted that a layout manner of a control circuit of the display device 100 is not limited thereto. For example, a connection manner between a first transistor switch, a second transistor switch, a third transistor switch, a control switch, a first light emitting element, and a second light emitting element in the embodiments of FIG. 4A to FIG. 12 can be adjusted according to an electrical difference (n-type or p-type) of the first transistor switch, the second transistor switch, the third transistor switch, and the control switch.

According to the foregoing embodiments, the present invention provides a display device, including the at least two light emitting elements emitting the light of colors in the same color system. The two light emitting elements respectively have two luminous efficiency-injection current density functions that are intersected with each other to define a critical transform current density. The at least one of the first light emitting element and the second light emitting element may be optionally turned on according to the ambient lightness or the gray level of the display device. The first light emitting element turned on is applied with the first current and the first light emitting element turned on has the first injection current density. The second light emitting element turned on is applied with the second current and the second light emitting element turned on has the second injection current density. The first injection current density is less than the critical transform current density, and the critical transform current density is less than the second injection current density.

The good luminous efficiency can be obtained when the first light emitting element and the second light emitting element respectively have the first injection current density and the second injection current density. Thus, in different ambient lightness or gray levels of the display device, a light emitting element with the good luminous efficiency is selected to be turned on and a light emitting element with the poor luminous efficiency is turned off, thereby effectively reducing the power consumption of the display device and efficiently saving the energy. In some embodiments of the present invention, the first light emitting element and the second light emitting element can be turned on simultaneously according to the display requirement, or when one of the first light emitting element and the second light emitting element fails, the other one that does not fail is selected to be turned on, thereby improving luminous stability of the display device.

Although the present disclosure has been described by using the foregoing implementations, is the implementations are not used to limit the present invention. A person skilled in the art can make various modifications and improvements without departing from the spirit and scope of the present disclosure. Therefore, the protection scope of the present disclosure should be subject to the scope defined by the appended claims.

What is claimed is:

1. A display device, comprising:
a substrate, comprising a pixel area;
a first light emitting element, disposed in the pixel area, emitting light of a first color and having a first luminous efficiency-injection current density function;
a second light emitting element, disposed in the pixel area, emitting light of a second color and having a second luminous efficiency-injection current density function, the second luminous efficiency-injection current density function being intersected with the first luminous efficiency-injection current density function to define a critical transform current density, wherein a difference value between a dominant wavelength of the light of the first color and a dominant wavelength of the light of the second color is less than 50 nm; and
a control circuit, configured to optionally turn on at least one of the first light emitting element and the second light emitting element, wherein the first light emitting element and the second light emitting element respectively have a first injection current density and a second injection current density, and the critical transform current density is between the first injection current density and the second injection current density.

2. The display device according to claim 1, wherein the first light emitting element and the second light emitting element are a red light emitting diode, a green light emitting diode, a blue light emitting diode, a yellow light emitting diode, a cyan light emitting diode, or a white light emitting diode.

3. The display device according to claim 1, wherein the first injection current density corresponding to a maximum light output power of the first luminous efficiency-injection current density function is substantially less than the critical transform current density CDc, and the second injection current density corresponding to a maximum light output power of the second luminous efficiency-injection current density function is substantially greater than the critical transform current density.

4. The display device according to claim 1, wherein the control circuit optionally turns on, according to an ambient lightness, the at least one of the first light emitting element and the second light emitting element.

5. The display device according to claim 1, wherein the control circuit optionally turns on, according to a gray level, the at least one of the first light emitting element and the second light emitting element.

6. The display device according to claim 1, wherein the control circuit comprises:
a first transistor switch, electrically connected to the first light emitting element and a voltage source, and having a first channel aspect ratio;
a second transistor switch, electrically connected to a first scan line, a data line and the first transistor switch;

a third transistor switch, electrically connected to the second light emitting element and the voltage source, and having a second channel aspect ratio; and a fourth transistor switch, electrically connected to a second scan line, the data line and the third transistor switch.

7. The display device according to claim 6, wherein the first channel aspect ratio is less than the second channel aspect ratio.

8. The display device according to claim 1, wherein the control circuit comprises:
   a first transistor switch, connected in parallel to the first light emitting element, and electrically connected to a first voltage source and a first scan line;
   a second transistor switch, connected in parallel to the second light emitting element, and electrically connected to a second voltage source and a second scan line;
   a control switch, electrically connected to a data line;
   a third transistor switch, electrically connected to the control switch, the first transistor switch, the first light emitting element, the second transistor switch, and the second light emitting element; and
   a capacitor, one end of the capacitor being electrically connected to the control switch and the other end thereof being optionally connected to the first light emitting element or the second light emitting element.

9. The display device according to claim 1, wherein the control circuit comprises:
   a first transistor switch, electrically connected to the first light emitting element, a sensing circuit, and a first scan line;
   a second transistor switch, connected in parallel to the second light emitting element, and connected to a second voltage source and a second scan line;
   a control switch, electrically connected to a data line;
   a third transistor switch, electrically connected to the control switch, the first transistor switch, the first light emitting element, the second transistor switch, and the second light emitting element; and
   a capacitor, one end of the capacitor being electrically connected to the control switch and the other end thereof being optionally and electrically connected to the first light emitting element or the second light emitting element.

10. The display device according to claim 1, wherein the control circuit comprises:
    a first transistor switch, electrically connected to a sensing circuit, the first light emitting element, and a first scan line;
    a second transistor switch, electrically connected to the sensing circuit, the second light emitting element, and a second scan line;
    a control switch, electrically connected to a data line;
    a third transistor switch, electrically connected to the control switch, the first transistor switch, the first light emitting element, the second transistor switch, and the second light emitting element; and
    a capacitor, one end of the capacitor being connected to the control switch and the other end thereof being optionally and electrically connected to the first light emitting element or the second light emitting element.

11. The display device according to claim 1, wherein the first light emitting element and the second light emitting element are disposed, through a connector together, in the pixel area, and the first light emitting element and the second light emitting element are connected to the control circuit by using an interconnection line.

12. A method for controlling a display device, comprising:
    providing a display device, comprising:
      a substrate, comprising a pixel area;
      a first light emitting element, disposed in the pixel area, emitting light of a first color; and
      a second light emitting element, disposed in the pixel area, emitting light of a second color, wherein a difference value between a dominant wavelength of the light of the first color and a dominant wavelength of the light of the second color is less than 50 nm;
    a first luminous efficiency-injection current density function of the first light emitting element being intersected with a second luminous efficiency-injection current density function of the second light emitting element to define a critical transform current density;
    optionally turning on, according to an ambient lightness or a gray level of the display device, at least one of the first light emitting element and the second light emitting element, wherein the first light emitting element turned on is applied with a first current and has a first injection current density, and the second light emitting element turned on is applied with a second current and has a second injection current density, wherein
    the first injection current density is less than the critical transform current density, and the critical transform current density is less than the second injection current density.

13. The method for controlling a display device according to claim 12, wherein the display device further comprises using a control circuit, the control circuit turns on, according to a first ambient lightness, the first light emitting element, and turns on, according to a second ambient lightness, the second light emitting element.

14. The method for controlling a display device according to claim 13, wherein the first ambient lightness is less than the second ambient lightness.

15. The method for controlling a display device according to claim 13, wherein the control circuit turns on, according to a third ambient lightness, the first light emitting element and the second light emitting element simultaneously.

16. The method for controlling a display device according to claim 12, wherein the display device further comprises using a control circuit, the control circuit turns on, according to a first grayscale value, the first light emitting element, and turns on, according to a second grayscale value, the second light emitting element.

17. The method for controlling a display device according to claim 16 wherein the first grayscale value is less than the second grayscale value.

18. The method for controlling a display device according to claim 12, wherein the control circuit turns on, according to a third grayscale value, the first light emitting element and the second light emitting element simultaneously.

19. The method for controlling a display device according to claim 12, wherein when one of the first light emitting element and the second light emitting element that are to be turned on fails, the other one of the first light emitting element and the second light emitting element is selected to be turned on.

* * * * *